United States Patent [19]

Yamamoto et al.

[11] 3,710,273

[45] Jan. 9, 1973

[54] AUTOMATIC FREQUENCY CONTROL

[75] Inventors: Keisuke Yamamoto, Hirakata; Toshimitsu Fujimori, Ibaragi, both of Japan

[73] Assignee: Matsushita Electric Industrial Co., Ltd., Osaka, Japan

[22] Filed: Feb. 4, 1971

[21] Appl. No.: 112,564

[30] Foreign Application Priority Data

| | | |
|---|---|---|
| Feb. 13, 1970 | Japan | 45/12710 |
| Feb. 13, 1970 | Japan | 45/12711 |
| Feb. 13, 1970 | Japan | 45/12712 |
| March 9, 1970 | Japan | 45/20674 |
| Sept. 3, 1970 | Japan | 45/77425 |

[52] U.S. Cl. ........................331/1 A, 331/17, 331/20

[51] Int. Cl. ............................................H03b 3/04

[58] Field of Search ..........178/69.5 TV, 7.3 S, 7.5 S, 178/69.5 F; 331/20, 18, 17, 1 A; 328/110, 109, 74; 307/232, 269; 325/423

[56] References Cited

UNITED STATES PATENTS

| | | | |
|---|---|---|---|
| 2,962,666 | 11/1960 | Pollak | 331/17 |
| 3,287,657 | 11/1966 | Widl | 331/17 |
| 3,573,650 | 4/1971 | Maltese | 331/1 |

*Primary Examiner*—John Kominski
*Attorney*—Stevens, Davis, Miller & Mosher

[57] ABSTRACT

An automatic frequency control (AFC) in which the sync signal and flyback signal are compared to detect the direction and amount of deviation of the flyback signal with respect to the sync signal, thereby producing AFC voltage pulses to control the oscillator of the horizontal circuit in the television set. The polarity of the pulses is determined by the direction or sense of deviation, and the pulse width is determined by the amount of deviation.

6 Claims, 7 Drawing Figures

K. YAMAMOTO AND
T. FUJIMORI
INVENTORS

BY Stevens, Davis, Miller & Mosher
ATTORNEYS

AUTOMATIC FREQUENCY CONTROL

The present invention relates to pulse width AFC and, more particularly, to a balancing type pulse width AFC. Throughout the specification, the term "AFC" is the abbreviation for automatic frequency control.

The usual pulse width AFC is designed to pull the oscillator into sync when the oscillating frequency is deviated lower than the pull-in frequency but not when the oscillating frequency is deviated in the higher direction. The balancing type AFC, on the other hand, is designed to pull in when the oscillating frequency is deviated from the pull-in frequency in either direction. Although the balancing type saw-tooth wave AFC is known in the art, no balancing type pulse width AFC has heretofore been proposed.

Accordingly, an object of the invention is to provide a balancing type pulse width AFC.

Another object of the invention is to provide a digitalized balancing type pulse width AFC.

A further object of the invention is to provide an AFC which is excellent in its noise immunity and pull-in characteristics.

According to the present invention there is provided an automatic frequency control, wherein the sync signal and flyback signal are compared to detect the direction and extent of deviation of the flyback signal with respect to the sync signal to thereby produce AFC pulse voltage at one of two pulse output terminals, the polarity of the AFC pulse being determined by the direction of the deviation, and the pulse width of the AFC pulse being determined by the extent of the deviation.

The invention will now be described in conjunction with the preferred embodiments thereof with reference to the accompanying drawing, in which.

Figure 1:
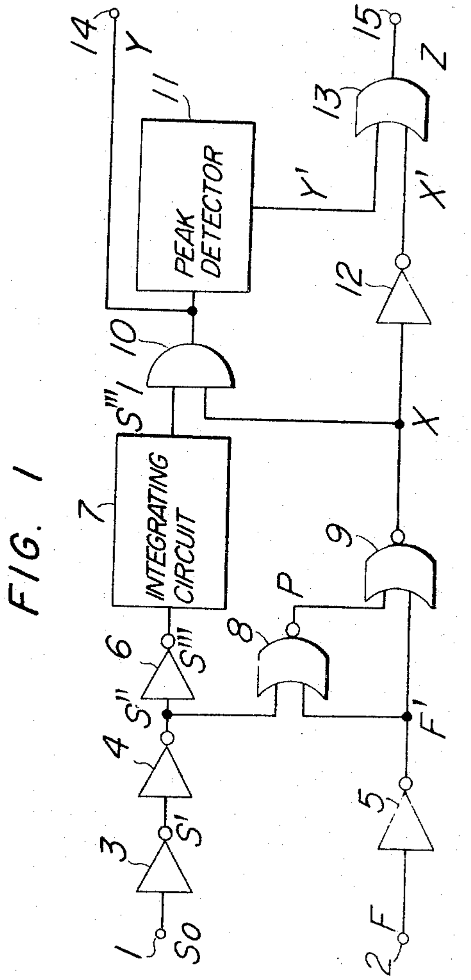
FIG. 1 is a schematic representation of part of a pulse width AFC according to the invention.

Referring now to FIG. 1, an AFC circuit embodying the invention includes inverters 3, 4, 5, 6 and 12, NOR gates 8 and 9, an integrating circuit 7, an AND gate 10, a peak detector 11 and an OR gate 13. The inverters 3 and 5 are required to provide the digital operation of the subsequent circuit. They serve to convert the input signals at the respective input terminals 1 and 2 into the respective rectangular pulses. The input terminal 1 receives the sync signal, while the input terminal 2 receives the flyback signal. The pulse width of the sync signal S is made wider than the pulse width of the flyback signal F. The former is rendered equal to the latter by the NOR gate 8 when both signals are in phase. This is done to improve the noise immunity characteristic of the AFC for the horizontal sync signal which is very susceptible to noise, and provide zero output in the subsequent pulse width detection stage when both input signals are absolutely in phase. Only when the oscillating frequency $f_r$ is lower than the sync signal frequency $f_O$, a positive pulse appears at output terminal 14. On the other hand, only when the former is higher than the latter, a negative pulse appears at output terminal 15.

Figure 2:
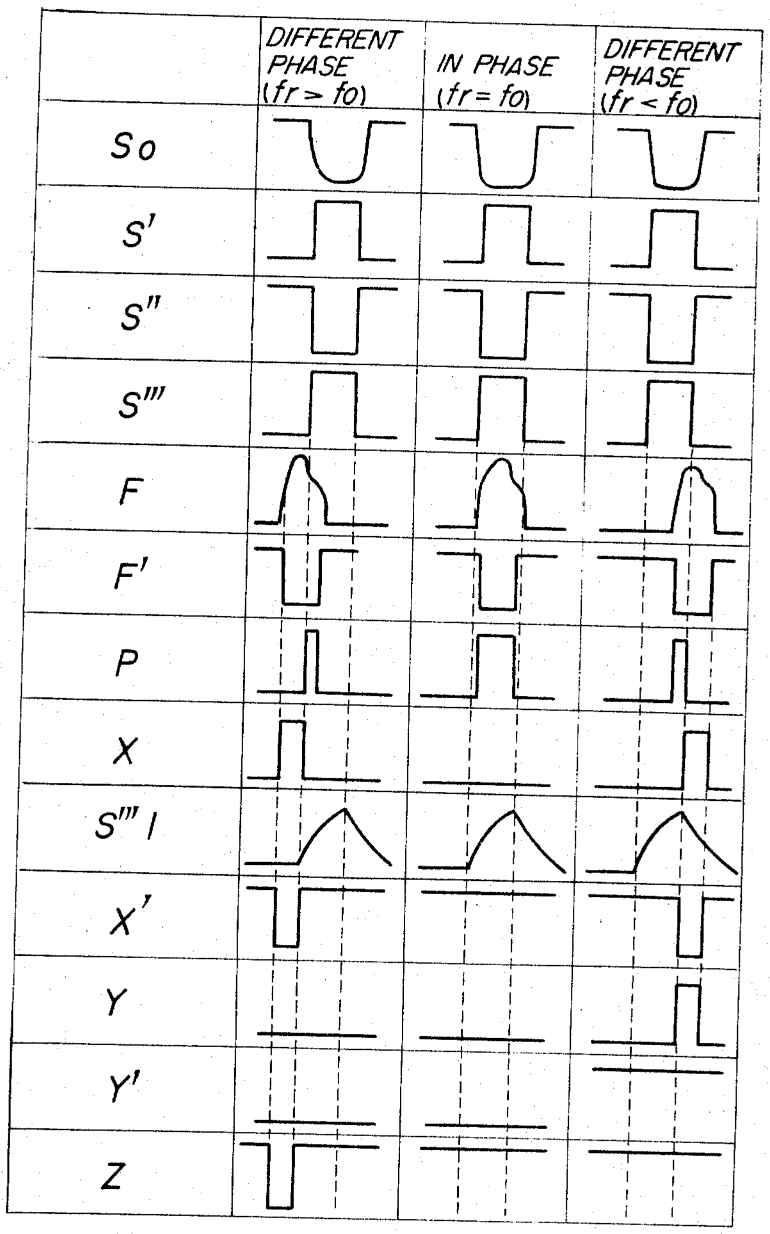
FIG. 2 shows waveforms to illustrate the operation of the circuit of FIG. 1.

As shown in FIG. 2, the sync signal input $S_O$ is inverted and amplified by the inverter 3 into a perfect rectangular wave S', which is further inverted by the inverter 4, as indicated at S'' in FIG. 2. Meanwhile, the flyback signal F is similarly inverted by the inverter 5 into a perfect rectangular wave F'. It is to be understood that the negative and positive polarities of the sync and flyback signals $S_O$ and F are only exemplary, and their polarities are arbitrary inasmuch as the circuit is constructed to produce the pulses S'' and F'.

The signal S'' is inverted by the inverter 6 into a positive pulse signal S''', which is integrated by the integrating circuit 7 into an integrated signal S'''I. The time constant T of integration is $$T = (1 \approx 3)\, x\, 1/\omega_O,$$

where $$\omega_o = 2\,\pi f_O.$$

The signal S'' is also fed together with the signal F' to the NOR gate 8. If $f_r > f_O$, the leading edge portion of input S'', that is, the trailing edge portion of input F', appears as output P from the NOR gate 8. If $f_r < f_O$, the trailing edge portion of input S'', that is, the leading edge portion of input F', appears. If both frequencies are in sync, the pulse width of the signal S'' is rendered equal to that of the signal F'. The output P thus produced is fed together with the signal F' to the NOR gate 9. If $f_r > f_O$, the portion of signal F' other than the portion coincident with the leading edge portion of signal S'' appears as output X from the NOR gate 9. If $f_r < f_O$, the portion of signal F' other than the portion coincident with the trailing edge portion of signal S'' appears. The pulse width of the output X is greater than the phase difference between S'' and F' (that is, the phase difference between $S_O$ and F. If both frequencies are in phase, the output X is zero.

The signal X is inverted by the inverter 12 into signal X' as an input to the OR gate 13. It is also fed together with the signal S'''I to the AND gate 10.

The AND gate 10 produces a positive pulse output Y if $f_r < f_O$. The output signal Y is converted by the peak detector 11 into a d-c output Y', which is fed together with the signal X' to the OR gate 13. The OR gate 13 provides negative pulse output only if $f_r > f_O$. In the above manner, it is possible to obtain the pulse output whose polarity is determined by whether the phase of $f_r$ is leading or lagging with respect to $f_O$.

Figure 3:
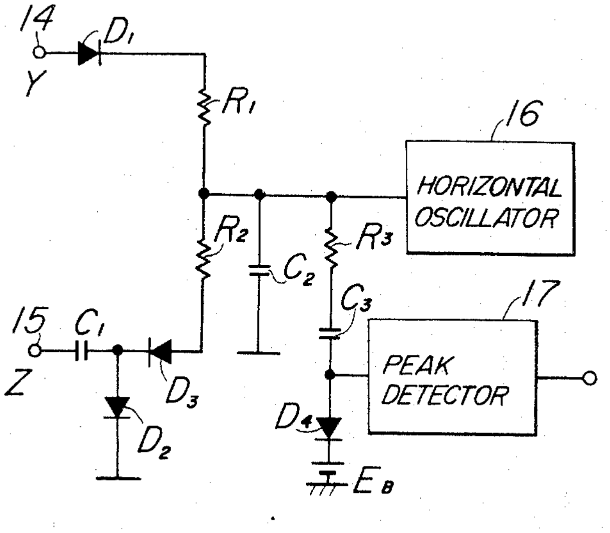
FIG. 3 is a schematic diagram, partly in block form, showing the remaining part of the pulse width AFC of FIG. 1.

FIG. 3 shows the succeeding stage of the AFC circuit. In this stage, the terminal 14 is grounded through a diode $D_1$, a resistor $R_1$ and a capacitor $C_2$. The terminal 15 is connected to a d-c level shifter circuit of a capacitor $C_1$ and a diode $D_2$, because it receives a negative signal Z. The connection between the capacitor $C_1$ and diode $D_2$ is connected through a diode $D_3$, a resistor $R_2$ and a capacitor $C_2$ to ground. It is to be noted that the signals Y and Z will not be presented simultaneously. The circuit described above operates like a mean value rectifying circuit, and the rectified output controls a horizontal oscillator 16. The resistors $R_1$, $R_2$ and $R_3$ and capacitors $C_2$ and $C_3$ constitute the usual dual integrating circuit. According to the invention, a series circuit of a diode $D_4$ and a power supply $E_B$ is connected between the capacitor $C_3$ and ground. At the connection point between the capacitor $C_3$ and diode $D_4$ is applied a d-c component obtained by smoothing the pulse output at point P (same as the signal at point P in FIG. 1) by a peak detector 17. The power supply $E_B$ serves to maintain high the reverse resistance of the diode $D_4$ and adjust the switching level of the diode $D_4$. A pulse of a constant level is present at point P when the AFC is operative. During this period, the diode $D_4$ is short-circuited. However, during most of the time no pulse is present at the point P, and during which the diode $D_4$ is in the open-circuit state.

Figure 4:
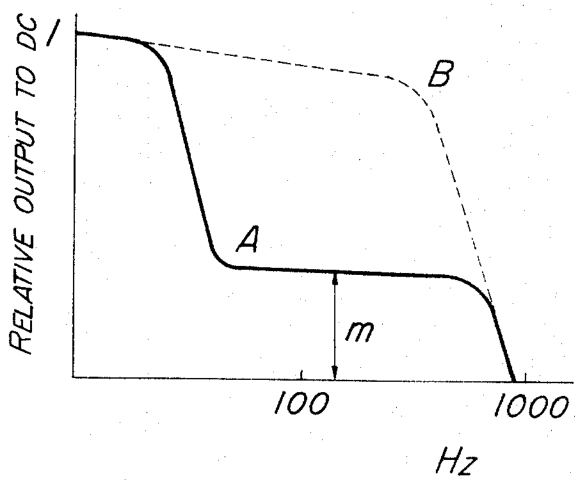
FIG. 4 is a graph showing the frequency characteristic of the dual time constant circuit in the AFC stage of FIG. 3.

FIG. 4 shows the frequency characteristics of the dual time constant circuit mentioned above, with curves A and B representing the characteristics when the diode $D_4$ is respectively short-circuited and open-circuited. With the diode $D_4$ in open-circuit, an extended frequency range can be covered as indicated by the curve B. Thus, if $f_r$ deviates from $f_O$, it may be readily pulled back into synchronization. As soon as the pull-in is completed, the diode $D_4$ is short-circuited to replace the frequency characteristic with the one indicated by the curve A, so that the noise immunity characteristic of the AFC can be improved. With the above dual time constant circuit, it is possible to provide a sufficiently small value of m in FIG. 4 (of the order of 0.1 to 0.001).

Figure 5:
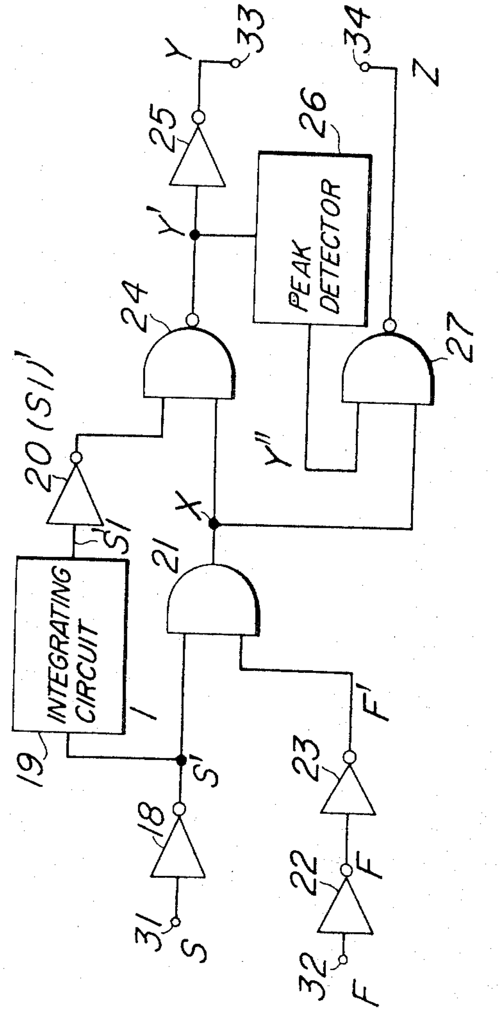
FIG. 5 is a schematic representation of part of another embodiment of the pulse width AFC according to the invention.
Figure 6:
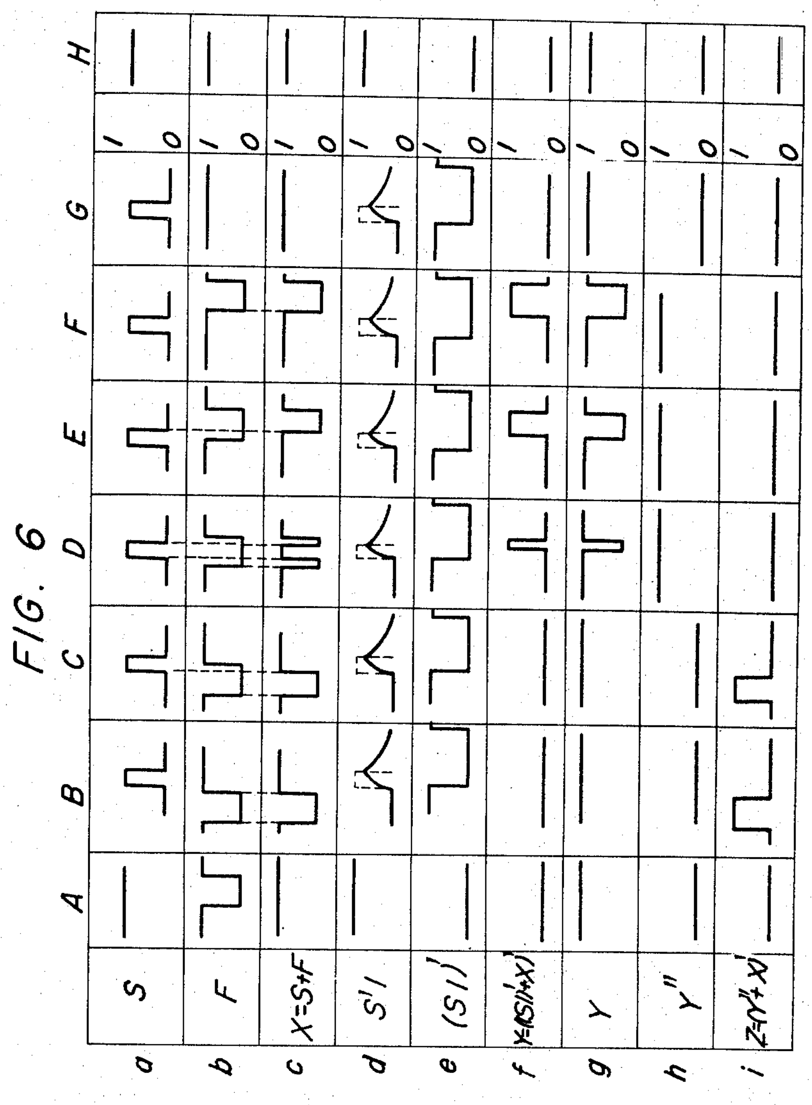
FIG. 6 shows waveforms to illustrate the operation of the circuit of FIG. 5.

FIG. 5 shows a second embodiment of the AFC according to the invention. It includes inverters 18, 20, 22, 23 and 25, an integrating circuit 19, an OR gate 21, a sync signal input terminal 31, a comparison signal input terminal 32 and output terminals 33 and 34. The operation of this circuit is illustrated in FIG. 6. With the sync signal S and comparison signal F as the inputs to the respective input terminals 31 and 32, and thence to the OR gate 21 through the inverters 18, 22 and 23, the OR gate 21 produces the resultant output. The output S′ of the inverter 18 is also integrated by the integrating circuit 19 into signal S′I, which is inverted by the inverter 20 into signal (SI)′, which is in turn fed together with the signal X to the NOR gate 24. The output of the NOR gate 24 is inverted by the inverter 25 into signal Y. If the sync signal S lags behind the comparison signal F in phase, a negative pulse of a pulse width proportional to the extent of lag is produced as the output Y. The output signal Y′ of the NOR gate 24 is fed to the peak detector 26 where it is converted into signal Y″, which is fed together with the signal X to the NOR gate 27 to produce output signal Z. If the sync signal S leads the comparison signal F in phase, a positive pulse of a pulse width proportional to the extent of lead is produced as the output Z.

Although it is desirable for the input signal F to have the same pulse width as the input signal S, it may have a greater pulse width. In case of FIG. 6, the pulse width of F is just double the pulse width of S.

In FIG. 6, the waveforms in column A result if the sync signal S is absent, those in column B if the pulse F is completely leading the pulse S, those in column C if the pulse F is leading but partly coincident with the pulse S, those in column D if F and S are in phase, those in column E if the pulse S is leading but partly coincident with the pulse F, those in column F if the pulse S is completely leading the pulse F, and those in column G if the comparison signal F is absent.

Figure 7:
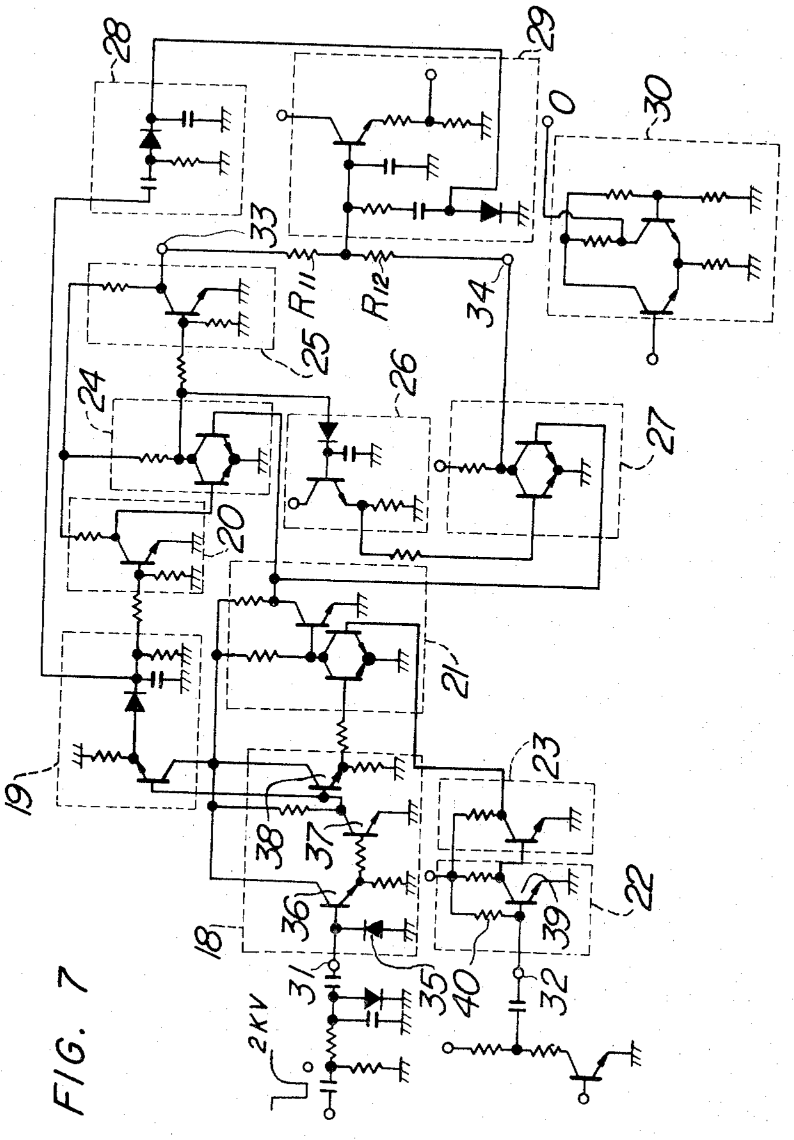
FIG. 7 is a circuit diagram showing a concrete example of the AFC circuit of FIG. 5.

FIG. 7 shows a practical example of the circuit of FIG. 5. In the Figure, the circuits corresponding to the respective parts in FIG. 5 are enclosed within respective dashed rectangles and designated by identical reference numerals. The circuit of FIG. 7 includes additional parts 28, 29 and 30, which are not shown in FIG. 5 and herein described in detail. The circuit 28 is a peak detector to detect the peak of the signal S′I to thereby detect the sync signal S. With this means, the reliability can be increased as compared to directly detecting the sync signal S, because the noise component is eliminated by the integrating circuit 19. In the circuit of FIG. 5, the output Y of the inverter 28 and the output Z of the NOR gate 27 will never appear simultaneously. As is apparent from FIG. 6, if either signal S or F is absent, $Y = 1$ and $Z = 0$. Thus, is the circuit of FIG. 7 by making the resistance of the resistor $R_{11}$ to be equal to the resistance of the resistor $R_{12}$ it is possible to vary the voltage E on the connection point between these resistors with respect to $E = ½ B$, decreasing from this value with increase in the pulse width of the output Y and increasing from this value with increase in the pulse width of the output Z. To this end, particular measures are incorporated in the inverters 18 and 22. Referring to FIG. 7, the input terminal 31 is connected through a diode 35 to ground. It is also connected to the base of a transistor 36 in the emitter follower connection. The transistor 36 has its emitter connected through a resistor to the base of a switching transistor 37 having the collector thereof connected to the base of a transistor 38. The transistors 36 and 38 may be dispensed with. The input terminal 32 is connected to the base of a transistor 39. A biasing voltage is applied to the base of the transistor 39 through a resistor 40.

In operation of the inverter 18, in the presence of the sync signal S the transistor 37 is cut off during the pulse portion of the sync signal S and carries current during the rest of the signal period. Thus, a positive horizontal sync pulse signal is obtained as the signal S′. In the absence of the sync signal S, on the other hand, the transistor 37 is held in the cut-off state. This, in this case voltage B (12 volts) constitutes the signal S′. In other words, the signal S′ in this case is at level "1".

In the operation of the inverter 22, in the presence of the horizontal flyback pulse signal F the transistor 39 is cut off curing the negative pulse portion of the flyback signal F, since the resistor 40 is set such that when the flyback pulse is impressed the mean level of the pulse is slightly raised to cut off the transistor 39 by the leading edge portion of the pulse. In the absence of the flyback signal F, however, the transistor 39 always carries current due to the resistor 40, so that the output of the transistor 39 is at level "0". In the above manner, it is possible to convert the input signals S and F such that the output Y is always at level "1" while the output Z is always at level "0" if either one or both of the input signals are absent as shown in columns A, G and H in FIG. 6.

The voltage E on the connection point between the resistors $R_{11}$ and $R_{12}$ is smoothed by the filter 29 and fed to the differential amplifier 30 to produce output "0."

The circuit 28 produce a filter frequency characteristic switching voltage to on-off control the diode in the filter 29.

What we claim is:

1. An automatic frequency control comprising a first gate circuit receiving a sync signal and a flyback signal as input signals and delivering a pulse the width of which corresponds to a portion of the flyback pulse by which the flyback signal deviates from the sync signal in their phases, an integrating circuit for integrating the sync signal, a second gate circuit receiving the outputs of the integrating circuit and the first gate circuit, a first output terminal provided at the output side of the second gate circuit, a peak detector for performing a peak detection of the output of the second gate circuit, a third gate circuit receiving the outputs of the peak detector and the first gate circuit, and a second output terminal provided at the output side of the third gate circuit, whereby two output pulses utilized as AFC voltages for an oscillator to be controlled are derived from the respective output terminals according to the phase deviation between the sync and the flyback signals, each of said output pulses having a polarity in accordance with the direction of the deviation and a width in accordance with the extent of the deviation.

2. An automatic frequency control according to claim 1, wherein said first gate circuit comprises a first NOR circuit receiving the sync signal and the flyback signal and a second NOR circuit receiving the output of the first NOR circuit and the flyback signal, said second gate circuit consists of an AND circuit receiving the outputs of the integrating circuit and the second NOR circuit, and said third gate circuit consists of an OR circuit receiving the outputs of the peak detector and the second NOR circuit.

3. An automatic frequency control according to claim 2, wherein said two output terminals are connected through a filter circuit to a horizontal oscillator, said filter circuit including a switching element and a peak detector, said switching element being supplied with the output of said first NOR circuit through said peak detector and thereby providing switching action in accordance with the gate output derived from both said sync signal and said flyback signal so as to extend the pass band of said filter circuit and provide an extended AFC pull-in range when said sync signal and said flyback signal are not in phase.

4. An automatic frequency control according to claim 1, wherein said first gate circuit consists of an OR circuit receiving the sync signal and the flyback signal, said second gate circuit consists of a first NOR circuit receiving the outputs of the integrating circuit and the OR circuit, and said third gate circuit consists of a second NOR circuit receiving the outputs of the peak detector and the OR circuit.

5. An automatic frequency control according to claim 4, further comprising a resistance circuit having two series resistors connected between the output terminals, said output pulses being applied to the respective end of said resistance circuit, whereby the output of said resistance circuit is taken from the connection point between said two resistors.

6. An automatic frequency control according to claim 1, wherein said two output terminals are connected through a filter circuit to a horizontal oscillator, said filter circuit including a switching element and a peak detector, said switching element being supplied with the output of said integrating circuit through said peak detector and thereby providing switching action in accordance with said sync signal so as to extend the pass band of said filter circuit and provide an extended AFC pull-in range when said sync signal is absent.

* * * * *